(12) United States Patent
Dite

(10) Patent No.: US 10,676,124 B2
(45) Date of Patent: Jun. 9, 2020

(54) STEERING COLUMN ASSEMBLY

(71) Applicant: TRW Limited, Solihull, West Midlands (GB)

(72) Inventor: Jan Dite, Herálec (CZ)

(73) Assignee: TRW Limited, Solihull, West Midlands ( * ) Notice: Subject to any disclaimer, the term of this patent is extended or adjusted under 35 U.S.C. 154(b) by 92 days.

(21) Appl. No.: 16/087,136

(22) PCT Filed: Mar. 23, 2017

(86) PCT No.: PCT/EP2017/057030
§ 371 (c)(1),
(2) Date: Sep. 21, 2018

(87) PCT Pub. No.: WO2017/162844
PCT Pub. Date: Sep. 28, 2017

(65) Prior Publication Data
US 2019/0111961 A1  Apr. 18, 2019

(30) Foreign Application Priority Data
Mar. 23, 2016 (GB) .................................. 1604977.7

(51) Int. Cl.
*B62D 1/184* (2006.01)
*B62D 1/19* (2006.01)

(52) U.S. Cl.
CPC ............. *B62D 1/184* (2013.01); *B62D 1/192* (2013.01)

(58) Field of Classification Search
CPC ......... B62D 1/192; B62D 1/195; B62D 1/184
See application file for complete search history.

(56) References Cited

U.S. PATENT DOCUMENTS 5,787,759 A * 8/1998 Olgren .................... B62D 1/184
280/777
7,685,903 B2 * 3/2010 Streng .................... B62D 1/184
74/492
(Continued)

FOREIGN PATENT DOCUMENTS

CN    101077713 A   11/2007
DE    102014111606 B3   1/2016
(Continued)

OTHER PUBLICATIONS

Patents Act 1977: Search Report under Section 17(5), Application No. GB 1604977.7, dated Sep. 5, 2016.
(Continued)

*Primary Examiner* — Nicole T Verley
(74) *Attorney, Agent, or Firm* — MacMillian, Sobanski & Todd, LLC

(57) ABSTRACT

A steering column assembly comprises a telescopic shroud having an outer shroud portion and an inner shroud portion, a clamp rail fixed to the inner shroud portion including a slot that extends axially along the inner shroud portion, a clamp bolt that extends perpendicular to the shroud that may be rotated around its long axis by operation of a locking lever, and a toothed block that is connected to the clamp bolt having a row of teeth on each side, the pitch between teeth of each row being equal to, or a whole multiple of, the pitch of the teeth of a corresponding row of the slot. The toothed block is supported by a carrier that moves in response to rotation of the clamp bolt to in turn move the toothed block between a clamped position and an unclamped position and supports the toothed block such that the toothed block is free to move from side to side when in the slot. The teeth of a first row of the slot and the corresponding teeth of the toothed block when in flank to flank contact prevent axial movement of the toothed block along the slot in a direction correspond- (Continued)

ing to a telescopic collapse of the shroud and in that the teeth of a second row of the slot and the corresponding teeth of the toothed block permit axial movement of the toothed block along the slot in a direction corresponding to a collapse of the shroud whilst applying a thrust to the toothed block that moves the toothed block sideways across the slot so that the flanks of the teeth of the first row face the flanks of the corresponding teeth of the toothed block.

16 Claims, 9 Drawing Sheets

(56) References Cited

U.S. PATENT DOCUMENTS

| | | | | |
|---|---|---|---|---|
| 8,375,822 B2* | 2/2013 | Ridgway | ............... | B62D 1/184 |
| | | | | 280/775 |
| 8,505,408 B2* | 8/2013 | Havlicek | ............... | B62D 1/195 |
| | | | | 280/775 |
| 9,428,215 B1* | 8/2016 | Nagatani | ............... | B62D 1/184 |
| 9,452,772 B2* | 9/2016 | Owens | ............... | B62D 1/185 |
| 9,663,135 B2* | 5/2017 | Myohoji | ............... | B62D 1/184 |
| 9,718,490 B2* | 8/2017 | Tanaka | ............... | B62D 1/184 |
| 9,783,221 B2* | 10/2017 | Sakuda | ............... | B62D 1/195 |
| 10,005,485 B2 | 6/2018 | Kurz et al. | | |
| 10,011,293 B2* | 7/2018 | Nagatani | ............... | B62D 1/185 |
| 10,202,139 B2* | 2/2019 | Tanaka | ............... | B62D 1/184 |
| 10,336,362 B2* | 7/2019 | Bodtker | ............... | B62D 1/195 |
| 10,442,456 B2* | 10/2019 | Davies | ............... | B62D 1/184 |
| 2011/0041642 A1 | 2/2011 | Havlicek | | |
| 2014/0000405 A1 | 1/2014 | Anspaugh et al. | | |
| 2015/0266497 A1 | 9/2015 | Yoshihara et al. | | |
| 2016/0144885 A1* | 5/2016 | Tanaka | ............... | B62D 1/187 |
| | | | | 74/493 |
| 2018/0178826 A1* | 6/2018 | Kagawa | ............... | B62D 1/195 |
| 2019/0152510 A1* | 5/2019 | Shiroishi | ............... | B62D 1/192 |
| 2019/0337552 A1* | 11/2019 | Buzzard | ............... | B62D 1/187 |

FOREIGN PATENT DOCUMENTS

| | | | | |
|---|---|---|---|---|
| EP | 3023317 A1 | 5/2016 | | |
| EP | 3075632 B1 * | 2/2018 | | |
| GB | 2352284 A * | 1/2001 | ............ | B62D 1/184 |
| JP | 2011-111019 A | 9/2011 | | |
| JP | 2017030726 A * | 2/2017 | ............ | B62D 1/195 |

OTHER PUBLICATIONS

PCT International Search Report and the Written Opinion, Application No. PCT/EP2017/057030 filed Mar. 23, 2017, dated Jul. 4, 2017.

* cited by examiner

STEERING COLUMN ASSEMBLY

CROSS-REFERENCE TO RELATED APPLICATIONS

This application is a national stage of International Application No. PCT/EP2017/057030, filed 23 Mar. 2017, the disclosures of which are incorporated herein by reference in entirety, and which claimed priority to Great Britain Patent Application No. 1604977.7, filed 23 Mar. 2016, the disclosures of which are incorporated herein by reference in entirety.

BACKGROUND TO THE INVENTION

This invention relates to improvements in steering column assemblies. More particularly, the invention relates to steering column assemblies including a positive locking system provided by the interaction between a toothed block and a rack.

It is known to provide a collapsible steering column assembly comprising a steering shaft that is supported within a steering column shroud. To prevent significant injury to the driver in the event of a crash the steering column should be able to collapse as an axial load is applied through the steering wheel, for instance in a front impact where an unrestrained driver is thrown onto the steering wheel.

A typical collapsible steering column assembly comprises a telescopic shroud, having an outer shroud portion and an inner shroud portion, an end of the inner shroud portion extending into the outer shroud portion. The outer shroud portion may be located closer to the steering wheel, or further from the steering wheel than the inner shroud portion. A telescopic steering shaft, also having an upper and lower shaft part, is supported inside the shroud through one or more bearing assemblies. The steering wheel is fixed to the upper shaft portion.

The part of the shroud closest to the wheel must be able to move, or collapse, during a crash so as to allow the steering wheel to move forwards relative to the vehicle body but be prevented from moving during normal use. There is also a need to fix the shroud relative to the vehicle body to define the rake position of the steering wheel. This is typically achieved by a clamp mechanism that secures the shroud to a support bracket that is in turn fixed to the vehicle body, perhaps to a cross beam provided behind the dashboard of the vehicle. The clamp mechanism may be adjustable to permit reach adjustment, or rake adjustment, or both, of the steering wheel. In the event of a crash the shroud must be able to move, and this is achieved if it is able to break free of the clamp mechanism, or for the support bracket to be able to break free of the vehicle body, to allow the steering column assembly to collapse telescopically.

A lever may be provided on an end of the a clamp bolt that forms a part of the clamp mechanism that the driver can push or pull to rotate the clamp bolt and thereby operate the clamp mechanism.

Steering column assemblies are known which include a clamp mechanism that relies solely on friction when locked to prevent unwanted movement of the column assembly. The clamp mechanism can be unlocked and locked by movement of a locking lever or, sometimes, electrically using a motor or perhaps hydraulically or pneumatically. These columns can typically resist radial and/or axial forces of 600 N applied at the steering wheel before slipping.

However, it is increasingly a requirement from car manufacturers that there should be no substantial movement of the steering column assembly when forces of up to 6000 N are applied. The objective is to prevent unwanted movements of the steering wheel in a crash so that the deployment of the air bag is ideally controlled.

For this, friction alone is often insufficient, as massive clamp forces would be needed to achieve this. Some method of Positive Locking is needed. Typically this involves the use of inter-engaging teeth.

There is a well-known problem with the type of "Positive-Locking" column which uses rows of inter-engaging teeth whereby, prior to operation of the locking lever by the driver, the selected steering wheel position has resulted in exact alignment of the tips of one row of teeth with the tips of the set of teeth with which they are supposed to engage. Inter-engaging of the teeth during the clamping operation is thereby blocked and, if excessive force is applied by the driver to the clamp lever to force it to complete its travel, permanent damage can occur to the tips of the teeth. At the very least, such a Tooth-on-Tooth occurrence will require the driver to consciously re-release the lever, find a slightly different wheel position and then re-engage the lever. Unless special means are provided to overcome this problem, then it is likely to occur during 10% to 20% of all adjustment operations. This is undesirable.

SUMMARY OF THE INVENTION

In accordance with a first aspect of the invention there is provided a steering column assembly comprising:

a telescopic shroud having an outer shroud portion and an inner shroud portion, an end of the inner shroud portion extending into the outer shroud portion, a clamp rail fixed to the inner shroud portion including a slot that extends axially along the inner shroud portion, the slot defining two opposing walls which each carry a row of teeth, the two rows thereby being spaced apart from one another with the teeth extending towards each other;

a clamp bolt that extends perpendicular to the shroud that may be rotated around its long axis by operation of a locking lever, a toothed block that is connected to the clamp bolt and is displaced on rotation of the clamp bolt, the toothed block having a row of teeth on each side, the pitch between teeth of each row being equal to, or a whole multiple of, the pitch of the teeth of the corresponding row of the slot, the toothed block being supported by a carrier element that moves in response to rotation of the clamp bolt to in turn move the toothed block between a clamped position in which the toothed block is located in the slot with the teeth of the toothed block in the same plane as the teeth of the slot and an unclamped position in which the toothed block is held such that the teeth of the toothed block are out of the plane of the teeth of the slot;

the carrier element supporting the toothed block such that the toothed block is free to move from side to side when in the slot, the teeth of the two rows of teeth of the slot and the teeth of the two rows of teeth of the toothed block are shaped such that for any given position of the outer shroud relative to the inner shroud the toothed block is free to move into the slot when the carrier element is in moved into the clamped position from the unclamped position without being blocked by the teeth of the toothed block striking the teeth of the slot, and characterized in that the teeth of a first row of the slot and the corresponding teeth of the toothed block when in flank to flank contact prevent axial movement of the toothed block along the slot in a direction corresponding to a telescopic collapse of the shroud and in that the teeth of a second row of the slot and the corresponding teeth of the toothed block permit axial movement of the toothed block along the slot in a direction corresponding to a collapse of the shroud whilst applying a thrust to the toothed block that moves the toothed block sideways across the slot so that the flanks of the teeth of the first row face the flanks of the corresponding teeth of the block.

By providing four rows of teeth, two on the slot and two on the toothed block arranged as described above, a steering assembly in accordance with the invention ensures that in the unclamped position of the clamp mechanism the rows of teeth on the moving rack are held clear of the rows of teeth of the fixed rack, and in an clamped position one row of teeth of the moving rack is interlocked with a row of teeth of the fixed rack, such interlocking in the clamped position being assured by arranging that the teeth on the slot and the toothed block are aligned relative to one another such that in the event that the end faces of the teeth of one of the rows on the fixed rack are aligned in a tooth on tooth position with the end faces of the teeth of one of the rows of the moving rack, the teeth of the other row on the slot will not be aligned in a tooth on tooth position with the teeth of the other row on the toothed block and further by the mechanism being so constructed and arranged that when this tooth on tooth event occurs on moving from the unclamped position to the clamped position then during continued movement the teeth of the slot interacts with the teeth of the toothed block to cause the toothed block to move sideways across in the direction of the rows of teeth that are not in a tooth on tooth position thereby to cause those rows of teeth to become inter-engaged when the mechanism finally reaches the locked position.

Because there is always one pair of rows of teeth that are not in a tooth on tooth position during locking, and the moving rack is caused to move to permit that pair of rows to engage, then positive locking is always assured.

Furthermore because the tips of the teeth of each row extend in a plane that is parallel to the tips of the teeth of the other rows it is ensured that in the event of a crash—which would tend to cause the fixed and moving racks to try to move parallel to one another in a direction along which the rows of teeth extend—there is no component of the force in the direction of unlocking movement of the moving rack. If this was present it would be highly undesirable as the crash load would attempt to stretch the clamp pin resulting in potential failure. At the very least this unwanted force would necessitate a beefed up support bracket against which the force could be reacted, which is again undesirable.

The teeth may therefore all extend in a direction parallel to the general direction of movement of the toothed block generated by the clamping mechanism as it moves from unlocked to locked.

The assembly may be arranged such that for all telescopic positions of the shroud portions, positive locking can be attained. One way of ensuring this is for by arranging for the teeth of the rows of teeth to all have the same pitch (the spacing from the tip of one tooth to the tip of an adjacent tooth. They may all have the same tooth height (measured from the throat to tip) so that they can be fully engaged.

The teeth of the first side of the slot and toothed block may be considered to be functional teeth in so far as they are actively engaged in a crash to prevent collapse. The teeth of the other side of the slot and toothed block may be considered to be non-functional teeth because they do not prevent movement of the shroud in the collapse direction but do push the toothed block across to the other side of the slot to allow the functional teeth to prevent further movement.

The purpose of the functional and non-functional teeth is to ensure that the toothed block is always located on the same side of the slot during a crash, regardless of the position in which it is located immediately following clamping when it is moved to the first position. This is advantageous because it ensures a consistent location of the toothed block relative to the axis of the shroud during a crash event.

The perpendicular distance between the tips of one row of teeth of the toothed block and the tips of the other row of the toothed block may be substantially equal to the spacing between the tips of one row of the slot and the roots of the other row, thereby substantially preventing rotation of the toothed block in the slot when the tips of one row of the toothed block are aligned with the tips of the corresponding row of teeth of the slot.

The teeth of one row of the slot may be staggered along the slot relative to the teeth of the other row of the slot, whilst the teeth of one row of the toothed block may be in alignment with the teeth of the other row of the toothed block.

Alternatively the teeth of one row of the toothed block may be staggered along the toothed block relative to the teeth of the other row of the block, whilst the teeth of one row of the slot may be in alignment with the teeth of the other row of the slot.

The teeth that are staggered may be offset relative to each other by substantially one half of the pitch between the teeth in a row.

All of the teeth in each row, of the slot and of the toothed block, may be spaced from the adjacent tooth or teeth by the same distance, i.e. the teeth of the row all have the same pitch e. The pitch may be equal to the movement of the toothed block from the contact of teeth on non-functional side to the contact of teeth on functional side.

The width c of the flattened tip part of each of the teeth on the non-functional side may be set preferably between 0.2 and 0.3 times the pitch e of the teeth.

The width d of each of the teeth of the toothed block on the non-functional side, measured at the base of each tooth may be chosen such that the following expression is satisfied:

$$d=c+[a2/tg(\alpha)]$$

where a2 is the height of the teeth of the toothed block and $tg(\alpha)$ is the pressure angle of the flanks of the teeth of the non-functional side that contact each other as the shroud collapes.

The width of the teeth of the slot, on the non-functional side, may be defined by the expression:

$$d=c+[b2/tg(\alpha)]$$

where b2 is the height of the teeth of the slot on the non-functional side.

The width of the teeth on the functional side may be smaller than the width of the teeth on the non-functional side.

The shape of every tooth in a row may be the same. The teeth may be aligned in the same orientation as the adjacent tooth or teeth. They may each have the same height, and same width.

Each of the teeth of the rows may comprise saw teeth. This allows a small pressure angle, perhaps down to 0 degrees, to be achieved on one flank of the tooth whilst maintaining a sufficient width at the root of the tooth to prevent it from snapping off.

The pressure angle of the flanks of the teeth on the functional side that contact each other as the column collapses may be zero degrees, to give the maximum blocking of movement independent of the coefficient of friction of the flank surfaces. A non-zero pressure angle may also be acceptable. As long as the tangent of the pressure angle is less than the friction coefficient acting between the teeth, then there will be no sideways separation of the teeth on the functional side, and hence a total positive toothed block on further collapse of the shroud will be assured.

Both of the teeth of the slot and the teeth of the toothed block on the functional side may include flat portions that have this zero, or near zero pressure angle so they contact over a wide area defined by the overlap of the flat portions.

The pressure angle of the flanks of the teeth on the non-functional side that contact each other as the shroud moves in the collapse direction may be between 30 degrees and 60 degrees, with a pressure angle of substantially 50 degrees being preferred, to give an optimal thrust of the toothed block towards the functional side. A coefficient of friction of the flanks of the teeth may be kept low, for instance using a low friction coating such as PTFE, to prevent binding.

Similarly, the pressure angle of the flanks of the teeth on the functional side that come into contact as the shroud is extends telescopically may be between 30 degrees and 60 degrees, with a pressure angle of substantially 50 degrees being preferred, to push the toothed block across to the function side if the driver tries to pull on the steering wheel during normal use. The pressure angle of the flanks of the teeth on the non-functional side that comes into contact as the shroud is extended may be zero degrees, or close to zero, to give positive blocking of movement when clamped against the wheel being pulled towards the driver.

A flat tip may be provided on the teeth located on the non-functional side that in use will slide over one another in the event of the toothed block moving along the slot whilst it is aligned with the functional side of the slot. The flat tip may be bounded by rounded corners which ensure that the tips will not be damaged when they come into contact and help guide the toothed block until the flat tips are in contact.

The provision of the flat tip maximizes the time the toothed block spends on the functional side as it moves along the slot.

The height b2 of the teeth of the slot relative to the width of the slot b1, and relative to the width a of the toothed block a measured between the tips of the two rows of teeth on the block, may be chosen such that when the flat tips are in contact the tips of the teeth on the functional side of the toothed block are in contact with, or within no more than 1 mm or 2 mm of the lands between the teeth of the slot on the functional side.

The lands between the teeth on the functional side may also be flat to guide the toothed block.

The tips of the teeth on the functional side may be pointed, without any notable flat portion, as there is no advantage in ensuring that the toothed block stays aligned with the non-functional side of the slot for any extended distance.

The clamp rail may be fixed to an upper face of the inner shroud portion or to a side face.

To ensure tooth on tooth blocking does not occur during clamping, the end faces of the teeth of the slot and/or the toothed block may be chamfered or bevelled to define complimentary ramps. The ramps formed by the ends of one of the two rows of teeth whose tips face each other may slope such that a line extended from the root of the tooth and onwards past the tips will intersect a corresponding line from the ramp of that other facing row of teeth. The ramps of the other two rows of teeth that face away may slope in the opposite direction such that a line extended from the tip of the tooth and onwards past the roots will intersect a corresponding line from the ramp of that other row of teeth.

In one arrangement, the ramps may be shaped such that the teeth are wider at their root than at their tips. The ramps ensure that in the event that the sides of teeth of the toothed block strike the sides of the teeth of the slot, any locking force which is applied will therefore be partially converted into the sideways force needed to move the moving toothed block to the side.

Of course, it need not be direct contact between the bevelled, ramped, end faces of the teeth that causes the sideways movement of the block. The toothed block and the rail alongside the slot may be provided with protrusions which strike one another when the teeth are, or would otherwise be, in a tooth on tooth position. These protrusions, rather than the teeth themselves, then generate the sideways force. The protrusions could be considered to be guides for the moving rack.

The steering column assembly may additionally include a rocker comprising a body from which extends a lever arm, the body having an opening through which the clamp bolt passes, the rocker converting a rotation of the clamp bolt about its axis in a first direction into an upward motion of the lever arm and into a downward motion when the clamp bolt is rotated in the opposing second direction, the toothed block being connected to a carrier element, the carrier element in turn being connected to the lever of the rocker arm such that movement of the lever arm up and down causes movement of the carrier element up and down between the first and second positions of the toothed block, whereby, with the carrier element in the lowered position, the toothed block is located in the first position within the slot and whereby, with the carrier element in the raised position, the teeth of toothed block are in the second position where they are held clear of the slot.

The connection between the clamp bolt and the toothed block defines a lost motion mechanism.

The lost motion mechanism may provide for lost motion between the clamp bolt and the rocker, or between the rocker and the carrier element, or between both the clamp bolt/ rocker and the rocker/carrier element.

The lost motion mechanism may permit an angular movement of the clamp bolt of at least 20 degrees, or at least 30 degrees, and preferably between 30 and 40 degrees, whilst achieving a linear movement of the toothed block of less than 20 mm.

Other advantages of this invention will become apparent to those skilled in the art from the following detailed description of the preferred embodiments, when read in light of the accompanying drawings.

DETAILED DESCRIPTION OF THE INVENTION

Figure 1:
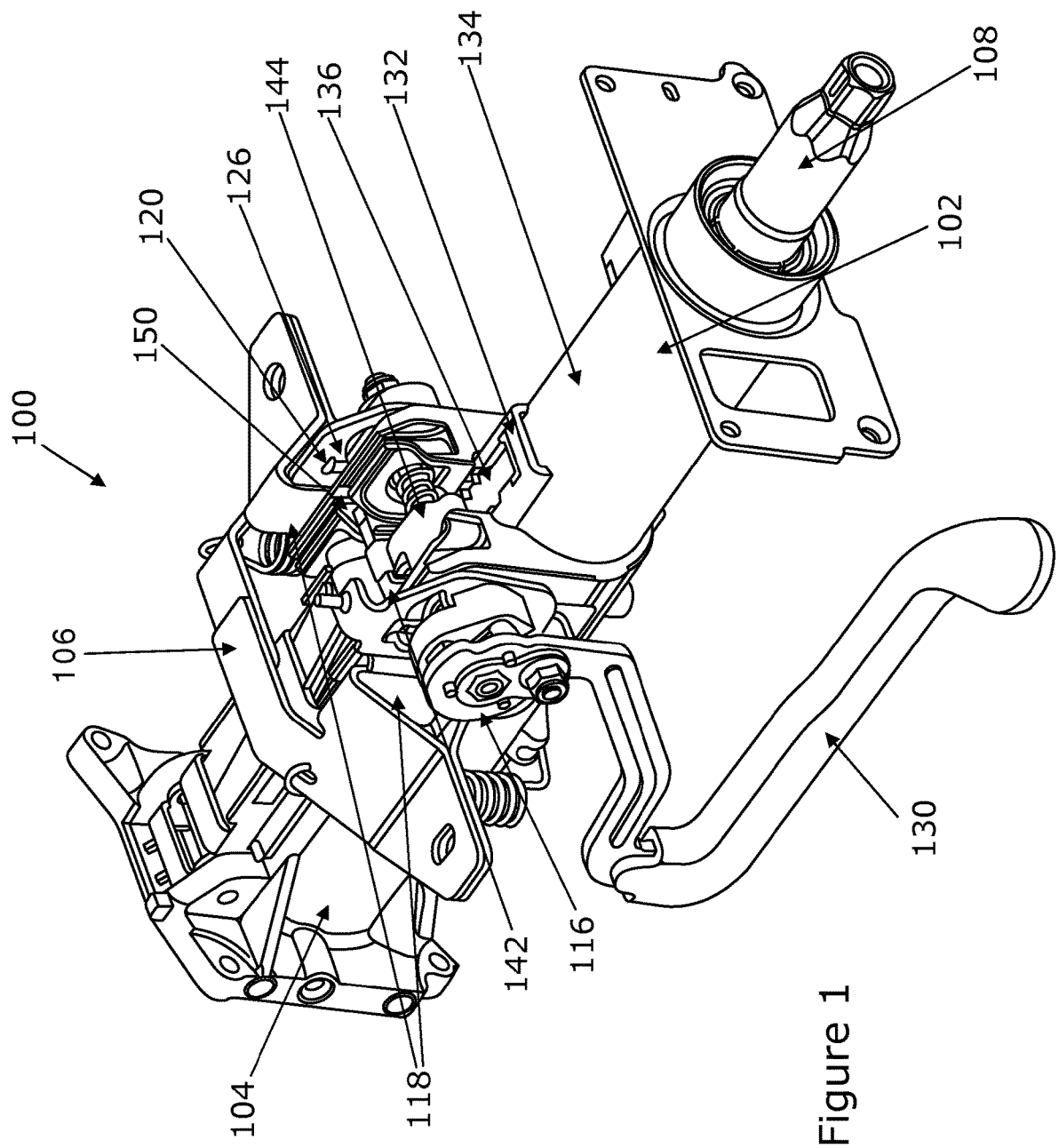
FIG. 1 depicts an isometric view of a steering column assembly in accordance with the first aspect of the invention.
Figure 2:
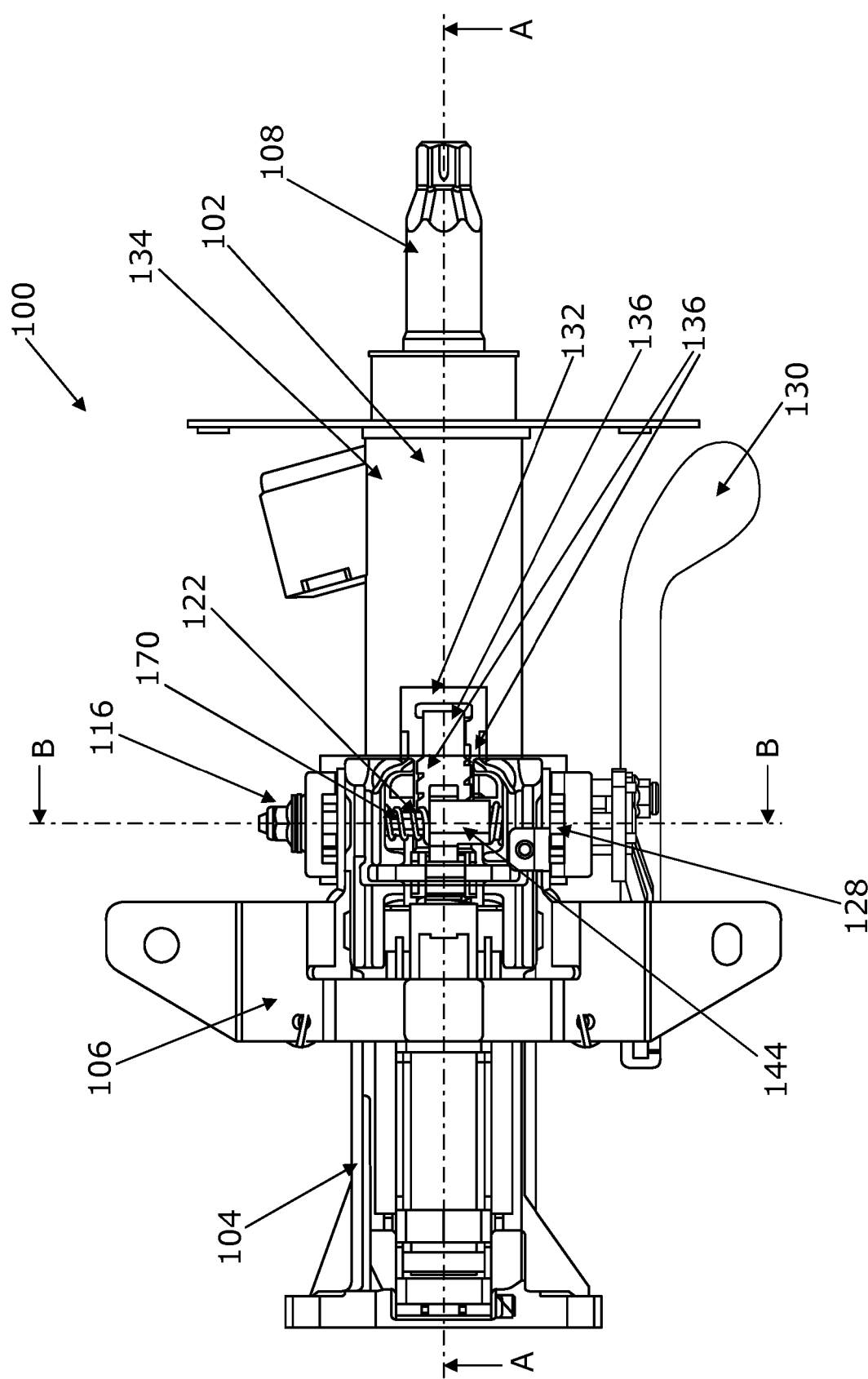
FIG. 2 shows a plan view of the steering column assembly of FIG. 1.
Figure 3:
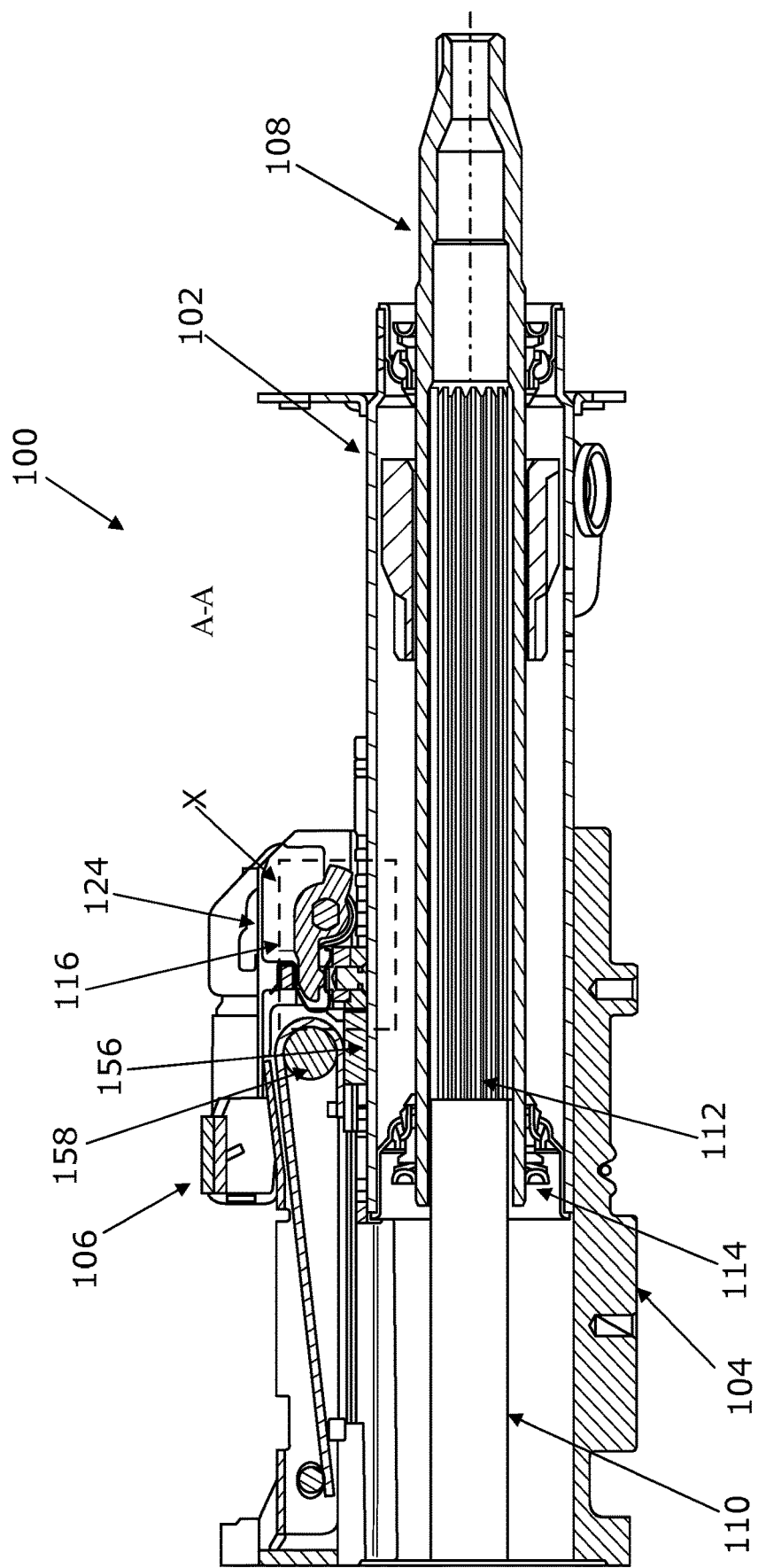
FIG. 3 is a cross-sectional representation of the steering column assembly of FIG. 2 along the line A-A.

Referring first to FIGS. 1 to 3, a steering column assembly 100 is shown, in accordance with the first aspect of the invention. The steering column assembly 100 comprise a shroud 102, 104 having and inner shroud portion 102 and an outer shroud portion 104, each of which comprises a substantially cylindrical tube. The shroud 102, 104 extends from a gearbox housing (not shown) that is fixed at a pivot point to a part of the vehicle body and also releasably fixed to a support bracket 106 which is secured to the vehicle, typically by welding or bolting it to a region under the dashboard at a point somewhere between the pivot and the steering wheel.

The shroud portions 102, 104 are moveable relative to each other with the end of the inner shroud portion 102 being a sliding fit within an end of the outer shroud portion 104. The shroud 102, 104 surrounds a telescopic steering column shaft 108, 110. The shaft 108, 110 includes an upper shaft portion 108 that at least partially surrounds a lower shaft portion 110, the two portions being connected through complimentary axially extending splines 112. The opposite end of the upper shaft portion 108 is tapered so that it can be secured to a steering wheel (not shown). The lower shaft portion 110 is connected to the gearbox housing (not shown), which in turn connects to the road wheels of the vehicle. The skilled person will understand that the invention also applied to so-called "inverted tube in tube" assemblies in which the moving part will slide over the fixed part rather than within it.

As depicted, the upper shaft portion 108 fits over the lower shaft portion 110 and can move axially whilst the lower shaft portion 110 is fixed in an axial direction. Similarly, the inner shroud portion 102 is located towards the steering wheel and slides within the outer shroud portion 104, which is also fixed in an axial direction. An upper column bearing assembly 114 is located between the upper shaft portion and the outer shroud portion. This snugly fills the space and ensures that the shaft 108, 110 is located securely within the shroud 102, 104.

The shroud 102, 104 is fixed to the bracket 106 by a clamp mechanism 116. The clamp mechanism 116 can be unlocked and locked to allow the rake of the steering column shroud 102, 104 to be adjusted by pivoting about the pivot point. When locked the steering column shroud 102, 104 cannot easily be moved.

The bracket 106 includes two arms 118 which extend generally downwards in a vertical plane and extend down either side of the shroud 102, 104. The bracket 106 is securable to the vehicle body using bolts (not shown) that pass through openings 120 in the bracket 116.

The clamp mechanism 116 comprises a clamp bolt 122 or pin which passes through a respective generally vertical slot 124 in each arm 118. The shape of the vertical slots 124 determines the available rake adjustment of the steering column shroud 102, 104. The slots 124 include a vertical rack 126 with a plurality of teeth. Respective cams 128 mounted on the clamp bolt 122 releasably engage with the teeth of the vertical rack 126 upon rotation of the clamp bolt 122. A lever 130 mounted adjacent to one end of the clamp bolt 122 enables this rotation. Thus, the rake of the steering column assembly 100 can be adjusted.

In order to adjust for reach, a clamp rail or horizontal rack 132 is provided which in the depicted embodiment is affixed to an outer surface 134 of the inner shroud portion 102. The horizontal rack 132 includes a slot 136 with two opposing and parallel rows of teeth 138, extending in an axial direction along the inner shroud portion 102.

Releasably engageable with the horizontal rack 132 is a toothed block 140. The toothed block 140 includes a row of teeth on each of its sides which are complementarily-shaped so as to allow engagement with the teeth of the horizontal rack 132. The toothed block 140 itself is held in a fixed position relative to the support bracket 106 by a carrier element 142. Thus, with the toothed block 140 in a clamped condition, the teeth provide positive locking of the toothed block 140, and thus the support bracket 106, relative to the horizontal rack 132 which prevents the inner shroud portion 102 moving in an axial direction. The shape and function of the teeth of the toothed block and the teeth of the slot will be explained in more detail later in this description with reference to FIGS. 7 to 11 of the drawings.

Figure 4:
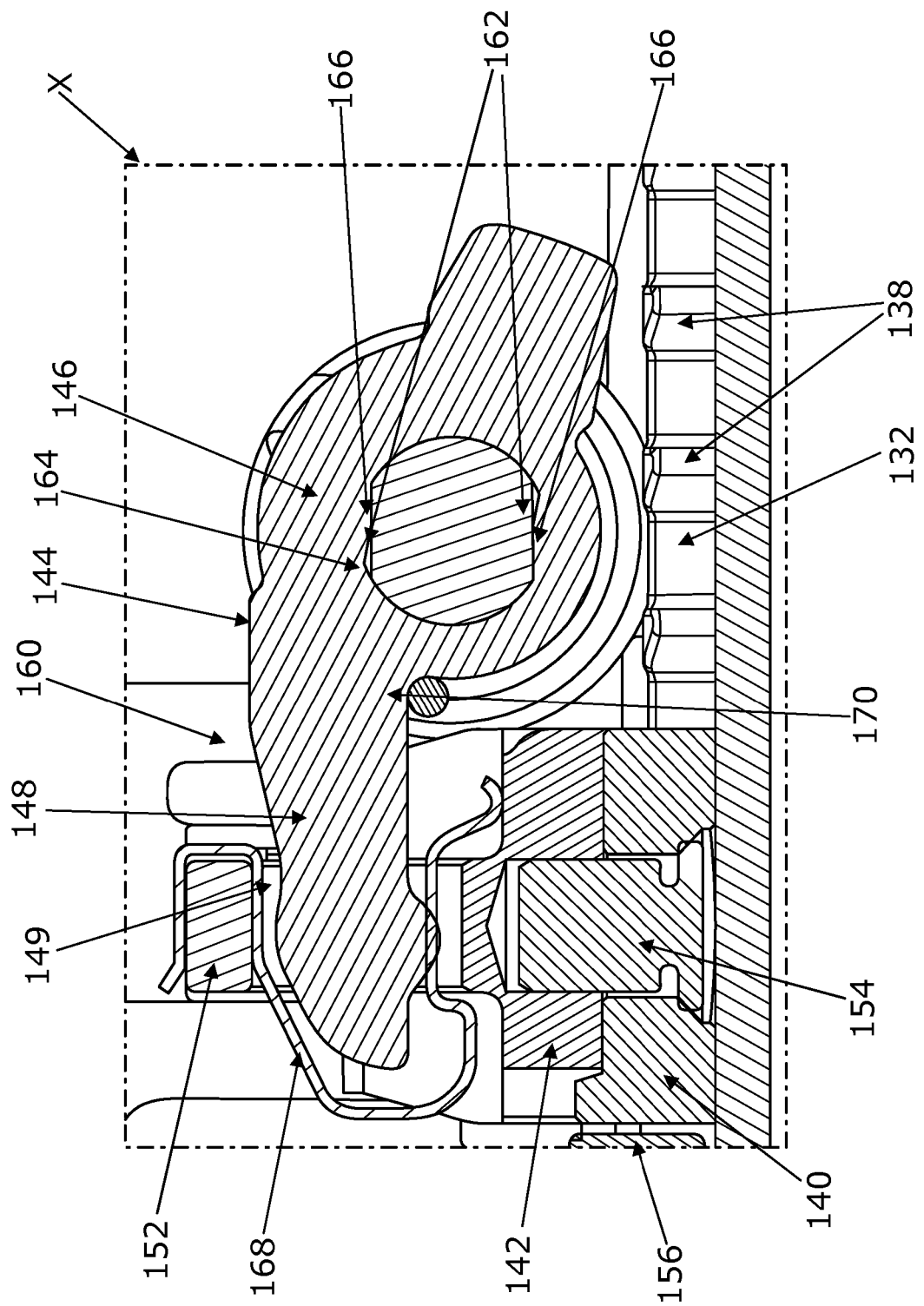
FIG. 4 is an enlarged view of the rocker, toothed block, and slot of FIG. 3.
Figure 5:
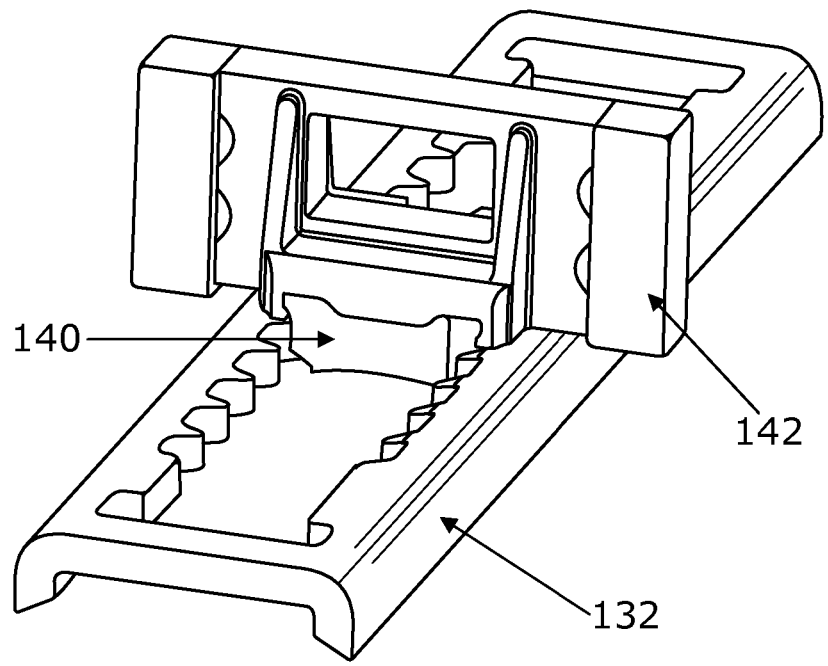
FIG. 5 shows the toothed block and the carrier element with the toothed block located in the slot in the clamped condition, all other parts being removed for clarity.

The releasable engagement of the toothed block 140 is controlled by a rocker 144 which is attached to the clamp bolt 122 and positioned, in use, between the two arms 118 of the support bracket 106. The rocker 144 is shown in detail in FIG. 4.

The rocker 144 includes a main body 146 which is located about the clamp bolt 122 and a lever arm 148 which extends towards and is received within an opening 149 in the carrier element 142. The carrier element 142 is held in the support bracket 106 within guides 150 which allow movement only in a radial direction relative to the shroud 102, 104. As such, upon rotation of the rocker 144 in a first direction, the lever arm 148 presses against an upper portion 152 of the carrier element 142, causing the movement of the carrier element 142 away from the horizontal rack 132 and drawing the toothed block 140 out of engagement. Upon rotation of the rocker 144 in a second direction opposite to the first direction, the carrier element 142 is lowered and the toothed block 140 is engaged with the horizontal rack 132.

The toothed block 140 is separable from the carrier element 142 in the event of a large force being exerted on the toothed block 140, for example in the event of a crash in which the driver of the vehicle impacts the steering wheel. The toothed block 140 is connected to the carrier element 142 by way of a frangible pin 154. The frangible pin 154 is configured to break upon the application of a predetermined force, which can thus be configured to be the force likely to be endured in a crash situation. The breaking of the frangible pin 154 allows the inner shroud portion 102, with horizontal rack 132 and toothed block 140 attached, to collapse, whilst the clamp mechanism 116 and carrier element 142 stay in position relative to the support bracket 106.

During collapse, the toothed block 140 will impact upon, and move a puller 156. The puller 156 comprises a strip of material, usually metal, which is deformed around an anvil 158 upon movement of the toothed block 140. As such, the collapse of the steering column assembly 100 is controlled.

The clamp mechanism 116, including the rocker 144 and carrier element 142, also comprises a lost motion mechanism 160. The lost motion mechanism 160 is configured such that the lever 130 of the clamp mechanism 116 can move through an angle which is comparatively larger than that to engage and disengage the toothed block 140. This results in an enhanced user experience.

A first part of the lost motion mechanism 160 is allowed by the relative shapes of the rocker 144 and clamp bolt at the point at which they engage. The relative shapes allow the clamp bolt 122 to freely within the rocker 144 before engaging and causing movement of the rocker 144. This allows the lever 130 to move through a predetermined angle allowed by the relative shapes of the rocker 144 and clamp bolt 122 before moving the rocker 144. This first part of the lost motion mechanism 160 therefore causes rotational reduction between the clamp bolt 122 and rocker 144.

In the depicted embodiment, the clamp bolt 122 is formed as a cylinder flattened so as to produce two additional opposing faces 162. Similarly, a bore 164 of the rocker 144 through which the clamp bolt 122 passes is substantially cylindrical but with two opposing inwardly-curved faces 166. Spaces are formed between the opposing faces 162 of the clamp bolt 122 and the inwardly-curved faces 166 of the rocker 144 which allows the lost motion before engagement. Due to the curvature of the inwardly-curved faces 166 of the rocker 144, the area of engagement is relatively large such that the force of the lever 130 motion is spread over the rocker 144. However, it is also possible to provide planar faces, although this may result in high levels of stress within the rocker 144.

Alternative methods of allowing motion between the clamp bolt 122 and the rocker 144 before engagement may also be used. For example, loose fitting pins between the two parts could allow free play or any other form of inter-engagement may be adapted to achieve this feature.

A further part of the lost motion mechanism 160 is formed by the engagement of the lever arm 148 of the rocker 144 with the carrier element 142. The opening 149 in the carrier element 142 is larger than the lever arm 148 such that the lever arm 148 may move within the carrier element 142 before contacting the carrier element 142. Additionally, as the opening 149 is wider than the lever arm 148, the carrier element 142 may move laterally during engagement of the toothed block 140 with the horizontal rack 132, aiding engagement.

As an additional feature, a leaf spring 168 is positioned at least partially between the lever arm 148 and the carrier element 142. In the depicted embodiment the leaf spring 168 acts to provide a biasing force to the carrier element 142, when the clamp mechanism 116 is in the clamped position. Advantageously, the leaf spring 168 also reduces rattle of the carrier element 142, ensuring that the assembly feels of a high quality to a user. The leaf spring 168 is fixed onto the upper portion 152 of the carrier element 142 and extends over an end of the lever arm 148. When the lever arm 148 moves clockwise, the leaf spring 168 does not absorb any of the motion and the lever arm 148 forces the carrier element 142 to move upwards in the guides 150. However, when the lever arm 148 moves anticlockwise, the spring 168 does resist the motion once the toothed block 140 is engaged, causing the biasing force to be applied to the toothed block 140 and providing increased force feedback to the user, such that they are aware that the toothed block 140 is engaged with the horizontal rack 132. In order to assist with the depression of the leaf spring 168, the lever arm 148 includes a protrusion which engages with the leaf spring 168 throughout the motion. Alternatively, the protrusion may be found on the leaf spring 168 itself.

A coil spring 170 is provided which locates the rocker 144 in the centre of the clamp bolt 122. The coil spring 170 resists any substantial lateral movement of the rocker 144 along the clamp bolt 122 whilst preventing or limit the transmission of vibrations between the support bracket 106, clamp bolt 122, and rocker 144, lowering the chances of unwanted rattle.

Figure 6:
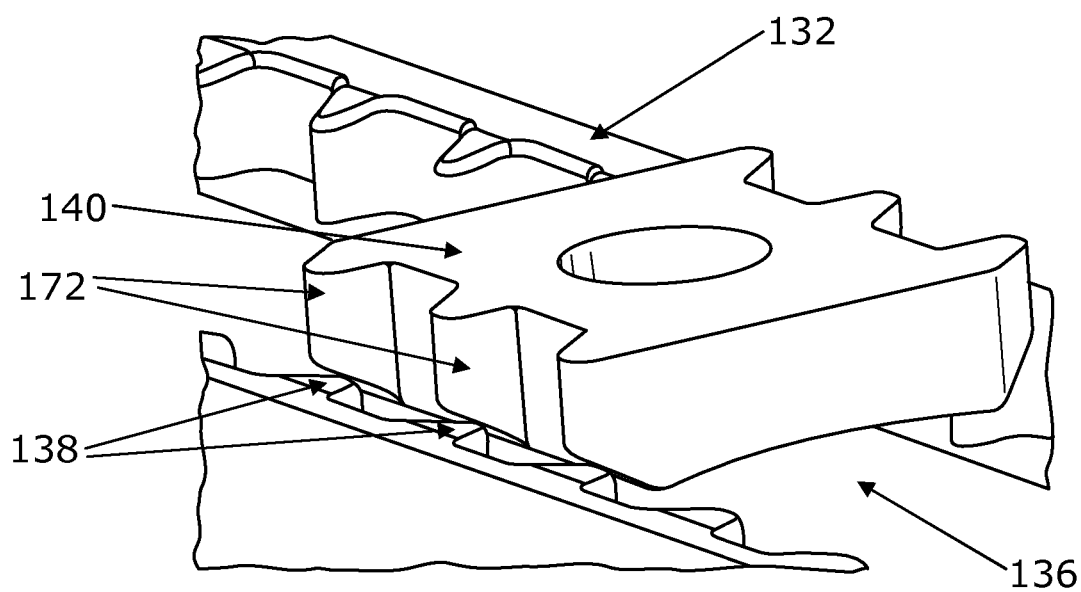
FIG. 6 shows the toothed block held in the unclamped position with the teeth of the toothed block clear of the teeth of the slot but with the teeth of one side of the toothed block directly above the teeth of the slot.

When moving from the unclamped position shown in FIG. 6 to the clamped position, the toothed block 140 will be pushed down into the slot 136 until the teeth 172 of the toothed block 140 are in the plane of the teeth 138 of the slot 136. During this motion, the toothed block 140 may move sideways if the teeth 172 on one side of the toothed block 140 are located fully, or partially, above any of the teeth 138 of the slot 136. The sideways thrust is achieved because of the sloped shape of the top of the teeth 138 of the slot 136 and the shape of the underside of the teeth 172 of the block 140. If there is no tooth on tooth contact, the block 140 will come to rest aligned with the centre line of the slot 136. This side to side movement is accommodated by a corresponding side to side sliding movement of the carrier element 142.

As can be seen in FIG. 8, the teeth 138 on one side of the slot 136 are offset from the teeth 138 on the other. In this example they are offset by one half pitch. Also the tips of the teeth 138 on the sides of the slot 136 face across the slot 136 towards each other, and the teeth 172 of the toothed block 140 face outwards from the sides of the block 140. This offset is crucial in ensuring a tooth on tooth situation is avoided.

Figure 7A:
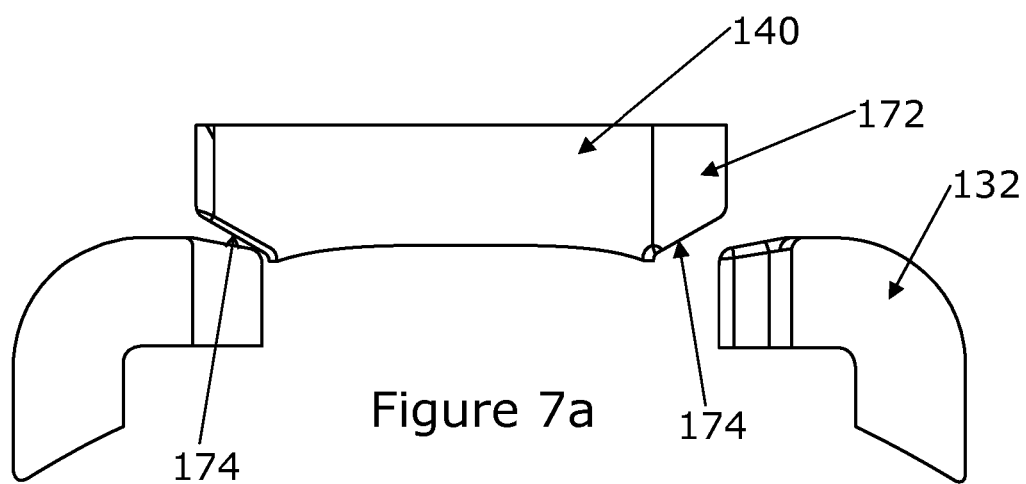
FIGS. 7a to 7c shows the path of travel of the toothed block from the unclamped position shown in FIG. 6 to the clamped position, the toothed block moving down into the slot and also being displaced to the side by the ramps on the sides of the teeth.
Figure 7B:
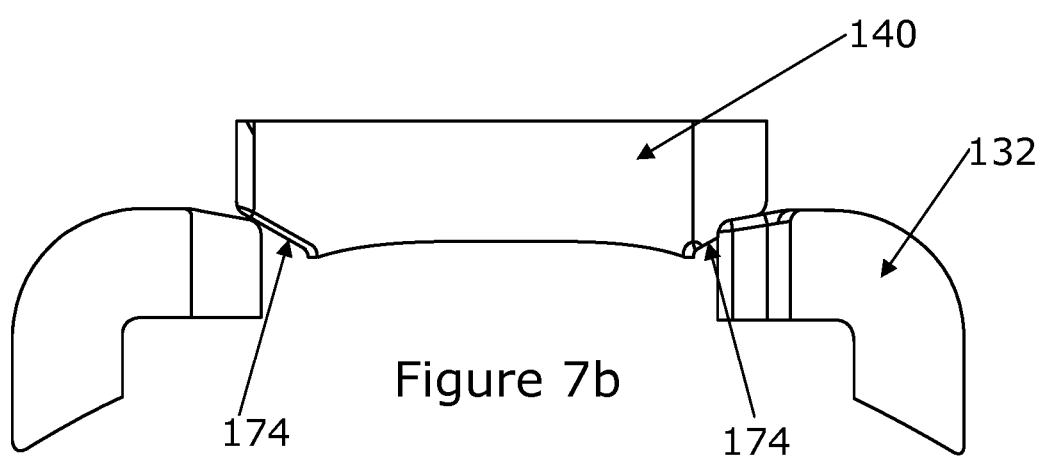
Figure 7C:
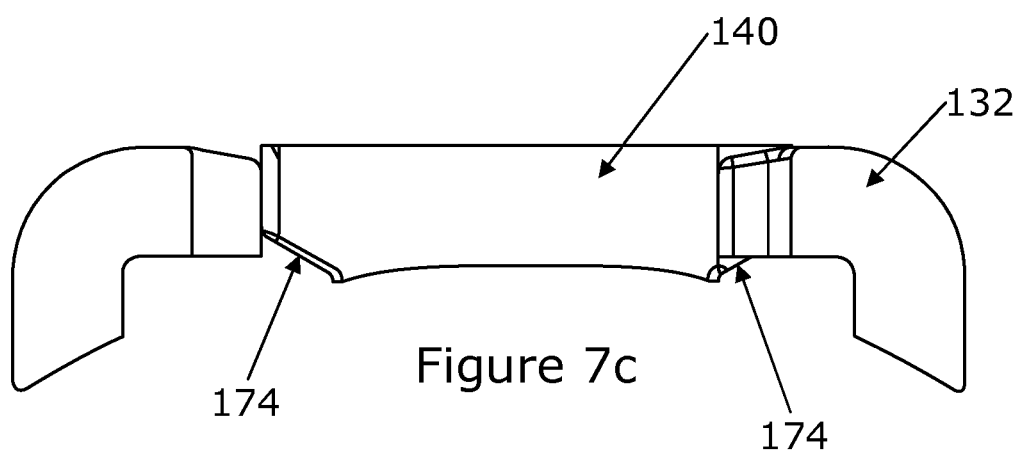
Figure 8A:
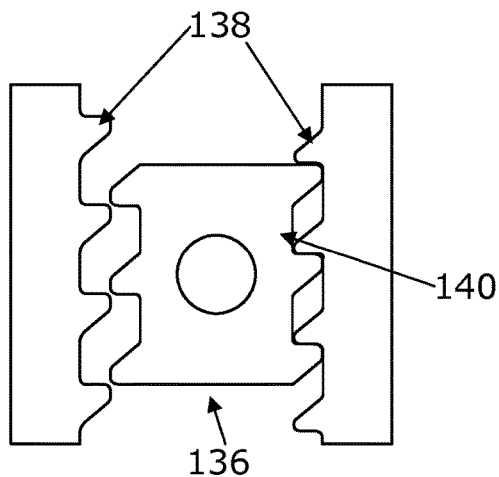
FIG. 8a to 8f shown the movement of the toothed block across and along the slot during a crash in which the toothed block starts off in a position on the non-functional side of the slot and ends up on the functional side where it prevents further movement as the teeth of the functional side come into flank on flank contact.
Figure 8B:
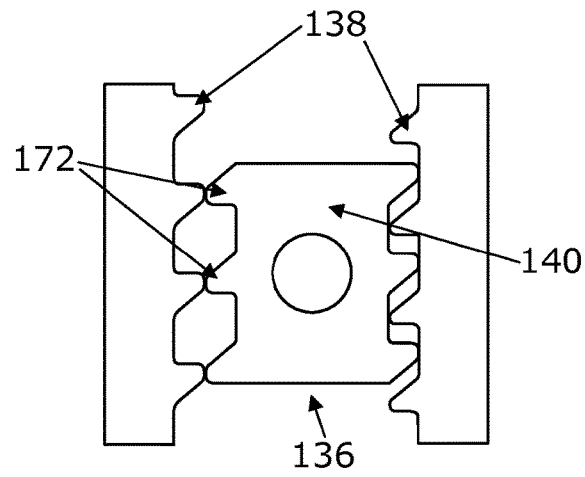
Figure 8C:
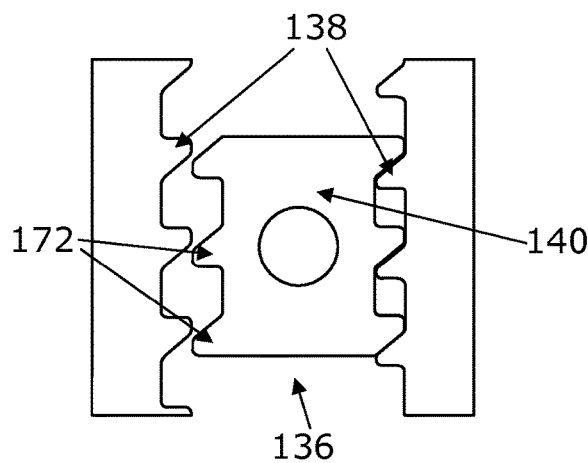
Figure 8D:
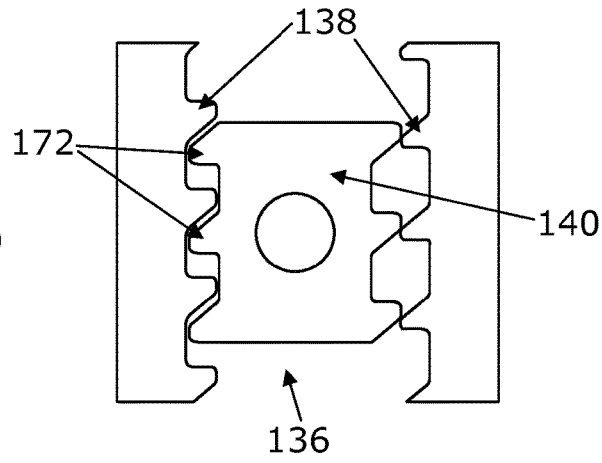
Figure 8E:
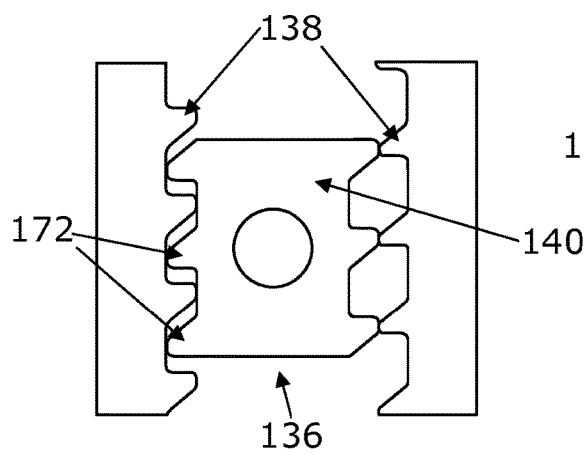
Figure 8F:
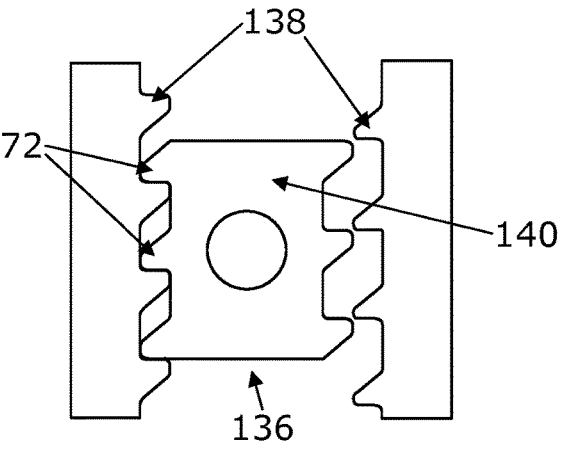

FIG. 7a to 7c show how the toothed block 140 will move sideways when a potential tooth on tooth collision occurs, allowing it to rest in the fully clamped condition within the slot 136 without being blocked. Ramps 174 on the sides of the teeth 172 help provide the sideways thrust that is needed, and the offset of the teeth 172 ensures there is always a space for the toothed block 140 to move down into once the end of the ramps 174 has been reached.

When clamped in the position shown in FIG. 7c, the inner shroud portion 102 cannot move telescopically by any significant amount in either axial direction because of interaction between the teeth 174 of the toothed block 140 and teeth 138 of the slot 136. Movement in the collapse direction of the shroud is blocked immediately if the toothed block 140—following clamping—is on the functional side of the slot 136. If it is on the non-functional side a small amount of movement is possible as the non-functional side teeth push the toothed block 140 across to the functional side of the slot 136. Friction in the system means that a reasonable amount of force is needed for this to happen. Similarly, if the driver tries to move the inner shroud portion 102 in a direction opposite to the crash direction, for instance by pulling on the steering wheel, the teeth of the non-functional side swap their purpose and become functional teeth, whilst those on the other side swap their function and act to push the toothed block 140 across the slot 136.

In the event of a crash, at low forces the toothed block 140 will prevent movement of the shroud but at higher forces the pin 154 that connects the toothed block 140 to the carrier element 142 will shear. This allows the toothed block 140 to be carried along in the slot 136, so that the inner shroud portion 102 can collapse. An energy absorbing mechanism may be provided that absorbs energy associated with this collapse movement. This may act between the toothed block 140 and the support bracket 106, so that as the toothed block 140 moves away from the carrier element 142 it activates the energy absorbing mechanism.

The teeth 138, 174 of the four rows—two on the toothed block 140 and two on the slot 136—are different on one side of the slot 136 compared with the other. This can best be seen in FIG. 9 of the drawings.

Figure 9:
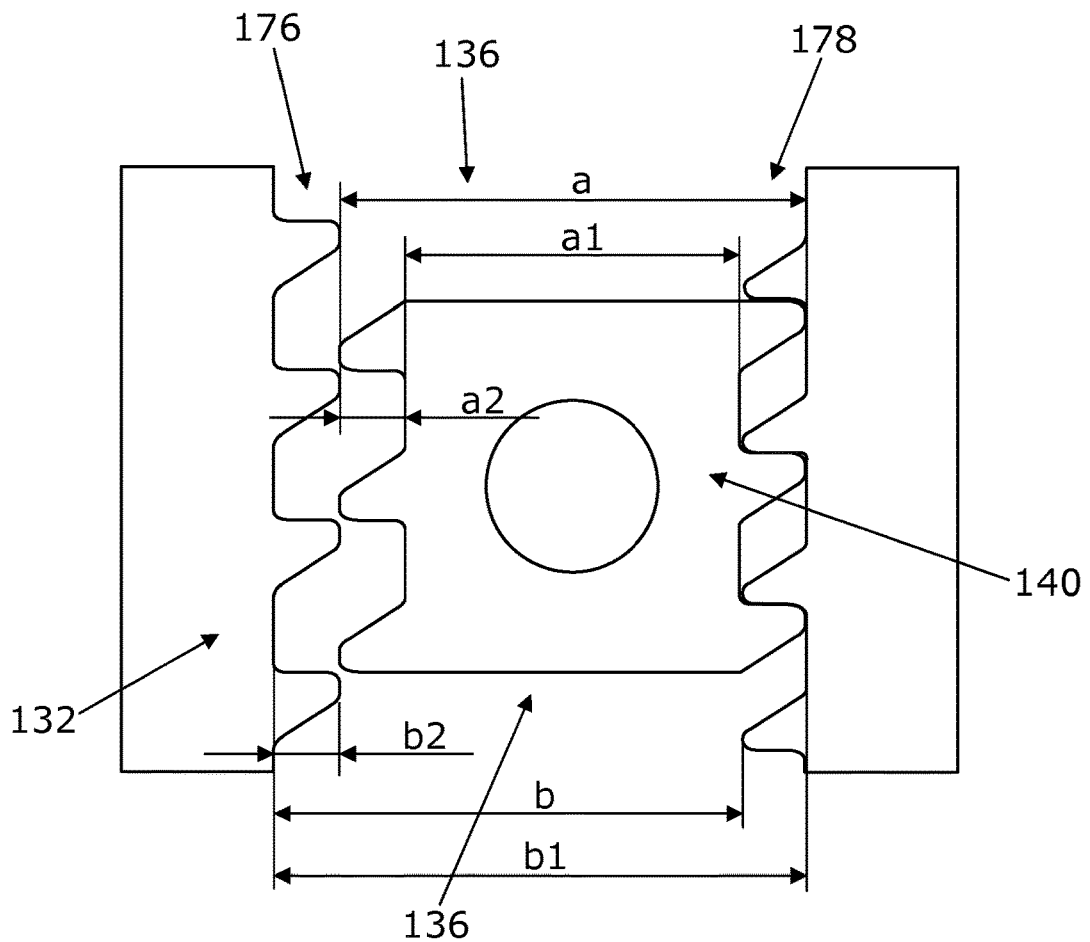
FIGS. 9 to 11 the various dimensions of the teeth, the slot and toothed block are marked using the terms that have been used throughout the description.
Figure 10:
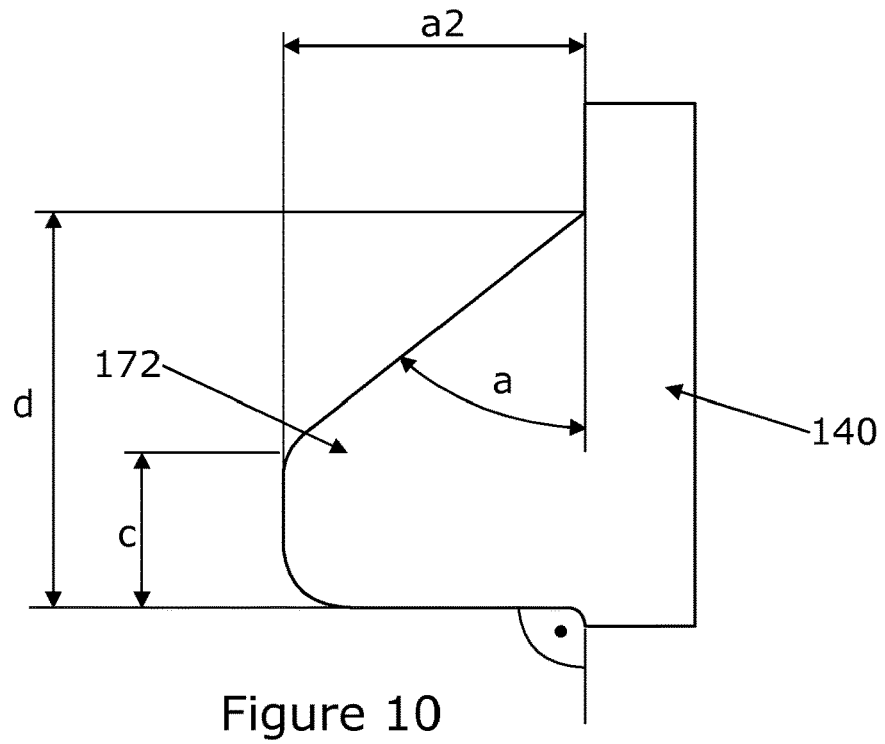
Figure 11:
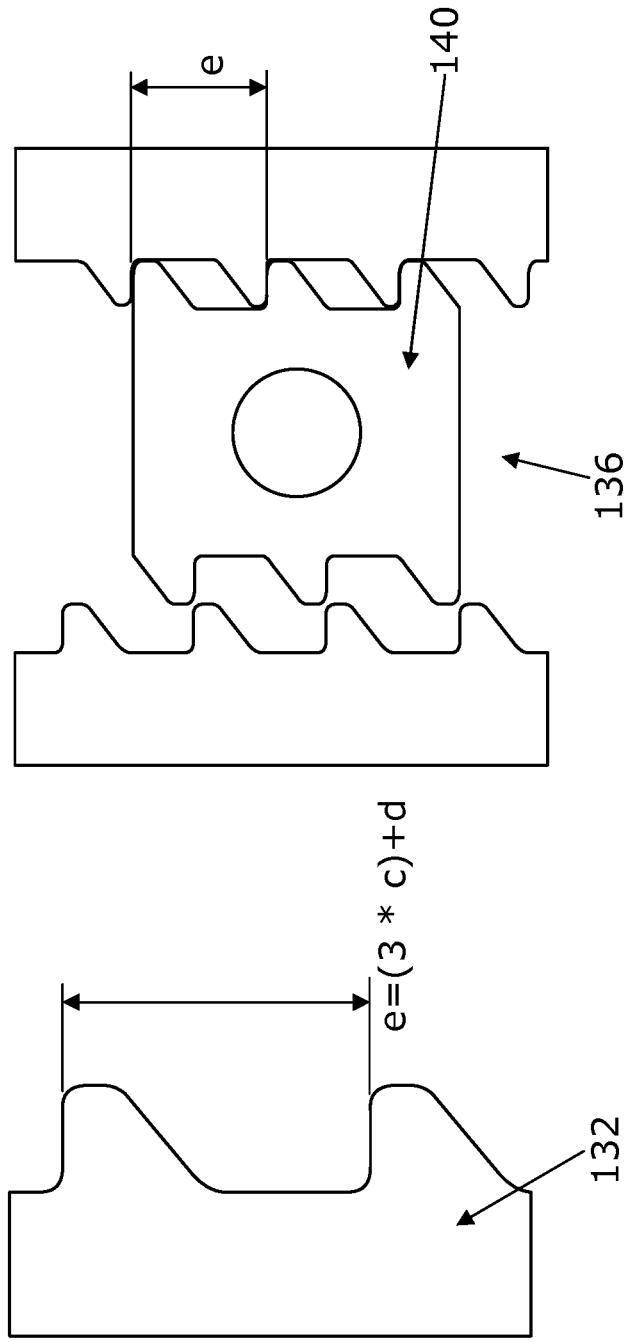

Specifically, as shown the teeth 138 of a first row 176 of the slot (on the right in FIG. 9) and the corresponding teeth 174 of the toothed block 140 (also on the right) have a zero pressure angle on their flanks that engage when the inner shroud portion 102 moves in a collapse direction (upwards movement of the slot 136 as shown in FIG. 9). This ensures that when those flanks come into contact they prevent any further axial movement of the toothed block 140 along the slot 136 in a direction corresponding to a telescopic collapse of the shroud. As can be seen contact is over a wide flat area of each flank. The right side of the slot 136 and toothed block 140 in FIG. 9 is considered to be the functional side 176 of the slot 136.

The teeth of a second row 178 on the left side of the slot 136 as shown in FIG. 9 and the corresponding teeth of the toothed block 140 have a much higher flank angle of 50 degrees on the flanks that contact each other in a collapse of the shroud. This means that once the flanks come into contact, further axial movement of the shroud relative to the toothed block 140 is possible which results in the toothed block 140 moving sideways across the slot 136 towards the functional side. The left hand side teeth therefore do not prevent the axial collapse and are considered to be the non-functional side 178.

Also notable is that the tips of the teeth on the non-functional side 178 only are flattened to help guide the toothed block 140 along the functional side 176 once it has been pushed fully across during a collapse. This helps prevent rotation of the toothed block 140 in the slot 136.

FIGS. 8a to 8f show the function of these teeth 138, 172 during movement of the toothed block 140 along the slot 136, when starting from a position in which the toothed block 140 is aligned with the non-functional side 178 of the slot 136. The slot 136 moves up the page starting at a low position in FIG. 8a and a higher position in FIG. 8f which marks the end of the allowable collapse travel of the shroud and slot 136. As can be seen the non-functional teeth 178 push the toothed block 140 over to the functional side 176, then guide it along the functional side 176 until eventually the flanks of the teeth on the functional side 176 engage and prevent further movement.

The teeth 138, 172 may have a range of different sizes, shapes and pitches. In a most preferred arrangement the teeth 138, 172 satisfy the following conditions;

Pitch of teeth, e, for all four rows is the same;
Height of all the teeth is the same-a2 is the height of the teeth of the toothed block and b2 is the height of the teeth of the slot;
Width of the toothed block a1 not including the height of the teeth on the toothed block satisfies the equation a1=b1−3*a2=>a2=(b1−a1)/3

Where b1 is the width of the slot excluding the teeth (i.e. from the base of the slot teeth)

The width of the toothed block including the toothed block teeth is given by the equation:

$$a=a1+2*a2$$

The height of each tooth is given be the parameters a1 and b1 as shown in FIG. 9. A Higher tooth can be chosen if a higher shear tooth strength is desired but in each case a must be always equal or smaller (also in tolerances) than b (where b=b1−b2) to provide smooth engagement and movement of Reach tooth block.

The flank angle α of the teeth flanks that are required to move the toothed block across the slot in the example shown is set at 500 although this can be varied and will depend on the coefficient of friction of the flanks. As a guide, a Minimal angle for smooth sliding of tooth on non-functional side with metal to metal flank contact may be set at 45°.

Other significant dimensions of the teeth in the preferred embodiment as shown are as follows:

c . . . This dimension defines the size of flat surface on the tip of tooth and this value should cover all tolerances of the tooth on both parts to provide contact teeth's tips during Reach tooth toothed block movement to the functional side(during crash) . . . ~1 mm is recommended. It is also driver for teeth pitch.

d . . . Tooth root, d=c+[a2/tg(α)]

e . . . The teeth pitch is the same for Reach tooth toothed block and Reach tooth plate. This teeth pitch is also equal to the movement of the Reach tooth toothed block from the contact of teeth on non-functional side (right hand side picture above) to the contact of teeth on the functional side.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering column assembly comprising:
a telescopic shroud having an outer shroud portion and an inner shroud portion, an end of the inner shroud portion extending into the outer shroud portion,
a clamp rail fixed to the inner shroud portion including a slot that extends axially along the inner shroud portion, the slot defining two opposing walls which each carry a row of teeth, the two rows thereby being spaced apart from one another with the teeth extending towards each other;
a clamp bolt that extends perpendicular to the telescopic shroud that may is configured to be rotated around its long axis by operation of a locking lever,
a toothed block that is connected to the clamp bolt and is displaced on rotation of the clamp bolt, the toothed block having a row of teeth on each side of the toothed block, the pitch between teeth of each row being equal to, or a whole multiple of, the pitch of the teeth of the corresponding row of the slot,
the toothed block being supported by a carrier that moves in response to rotation of the clamp bolt to in turn move the toothed block between a clamped position in which the toothed block is located in the slot with the teeth of the toothed block in the same plane as the teeth of the slot and an unclamped position in which the toothed block is held such that the teeth of the toothed block are out of the plane of the teeth of the slot;

the carrier supporting the toothed block such that the toothed block is free to move from side to side when in the slot, the teeth of the two rows of teeth of the slot and the teeth of the two rows of teeth of the toothed block are shaped such that for any given position of the outer shroud portion relative to the inner shroud portion the toothed block is free to move into the slot when the carrier is in moved into the clamped position from the unclamped position without being blocked by the teeth of the toothed block striking the teeth of the slot, and wherein the teeth of a first row of the slot and the corresponding teeth of the toothed block when in flank to flank contact prevent axial movement of the toothed block along the slot in a direction corresponding to a telescopic collapse of the telescopic shroud and in that the teeth of a second row of the slot and the corresponding teeth of the toothed block permit axial movement of the toothed block along the slot in a direction corresponding to a collapse of the telescopic shroud whilst applying a thrust to the toothed block that moves the toothed block sideways across the slot so that the flanks of the teeth of the first row face the flanks of the corresponding teeth of the toothed block.

2. The steering column assembly as claimed in claim 1, wherein the teeth extend in a direction parallel to the general direction of movement of the toothed block generated by the clamping mechanism as it moves from unlocked to locked.

3. The steering column assembly as claimed in claim 1, wherein the teeth of the rows of teeth all have the same pitch and/or tooth height.

4. The steering column assembly as claimed in claim 1, wherein, during a crash, the toothed block is always located on the same side of the slot, regardless of the position in which the toothed block is located immediately following clamping.

5. The steering column assembly as claimed in claim 1 wherein the perpendicular distance between tips of one row of teeth of the toothed block and tips of the other row of teeth of the toothed block is substantially equal to the spacing between tips of the teeth of one row of the slot and roots of the teeth of the other row of the slot.

6. The steering column assembly as claimed in claim 1, wherein the teeth of one row of the slot are staggered along the slot relative to the teeth of the other row of the slot, whilst the teeth of one row of the toothed block are in alignment with the teeth of the other row of the toothed block.

7. The steering column assembly as claimed in claim 1, wherein the teeth of one row of the toothed block are staggered along the toothed block relative to the teeth of the other row of the toothed block, whilst the teeth of one row of the slot are in alignment with the teeth of the other row of the slot.

8. The steering column assembly as claimed in claim 1 wherein the teeth of a first side of the slot and toothed block are considered to be functional in so far as the teeth are actively engaged in a crash to prevent collapse and the teeth of the other side of the slot and toothed block are considered to be non-functional in so far as the teeth do not prevent movement of the telescopic shroud in the collapse direction but do push the toothed block across to the other side of the slot to allow the functional teeth to prevent further movement.

9. The steering column assembly as claimed in claim 8, wherein all of the teeth in each row of the slot and toothed block have a pitch that is equal to the movement of the toothed block from the contact of teeth on the non-functional side to the contact of teeth on the functional side.

10. The steering column assembly as claimed in claim 9, wherein a width, of each of the teeth of the toothed block on the non-functional side, measured at the base of each tooth, may be chosen such that the follow expression is satisfied:

$$d=c+[a2/tg(\alpha)]$$

where a2 is the height of the teeth of the toothed block and $tg(\alpha)$ is a pressure angle of flanks of the teeth of the non-functional side that contact each other as the telescopic shroud collapes.

11. The steering column assembly as claimed in claim 9, wherein a width of the teeth of the slot on the non-functional side are defined by the expression:

$$d=c+[b2tg(\alpha)]$$

where b2 is the height of the teeth of the slot on the non-functional side.

12. The steering column assembly as claimed in claim 9, wherein a width of the teeth on the functional side is smaller than a width of the teeth on the non-functional side.

13. The steering column assembly as claimed in claim 9, wherein a pressure angle of the flanks of the teeth on the non-functional side that contact each other as the steering column collapses is between 30 and 60 degrees.

14. The steering column assembly as claimed in claim 9, wherein a height, of the teeth of the slot relative to a width of the slot, and relative to a width, of the toothed block as measured between the tips of the two rows of teeth on the block, is configured to be chosen such that when the flat tips are in contact the tips of the teeth on the functional side of the toothed block are in contact with, or within no more than 1 mm or 2 mm of lands between the teeth of the slot on the functional side.

15. The steering column assembly as claimed in claim 1, further comprising a rocker comprising a body from which extends a lever arm, the body having an opening through which the clamp bolt passes, the rocker converting a rotation of the clamp bolt about an axis thereof in a first direction into an upward motion of the lever arm and into a downward motion when the clamp bolt is rotated in the opposing second direction, the toothed block being connected to a carrier element, the carrier element in turn being connected to the lever arm of the rocker such that movement of the lever arm up and down causes movement of the carrier element up and down between the first and second positions of the toothed block, whereby, with the carrier element in the lowered position, the toothed block is located in the first position within the slot and whereby, with the carrier element in the raised position, the teeth of toothed block are in the second position where they are held clear of the slot.

16. The steering column assembly as claimed in claim 1, wherein the connection between the clamp bolt and the toothed block defines a lost motion mechanism.

* * * * *